United States Patent
Hauer

(10) Patent No.: US 6,811,181 B2
(45) Date of Patent: Nov. 2, 2004

(54) GAS BAG MODULE AND VEHICLE STEERING WHEEL

(75) Inventor: Constantin Hauer, Schöllkrippen (DE)

(73) Assignee: TRW Automotive Safety Systems GmbH & Co. KG, Aschaffenburg (DE)

(*) Notice: Subject to any disclaimer, the term of this patent is extended or adjusted under 35 U.S.C. 154(b) by 120 days.

(21) Appl. No.: 10/109,265

(22) Filed: Mar. 28, 2002

(65) Prior Publication Data

US 2002/0140212 A1 Oct. 3, 2002

(30) Foreign Application Priority Data

Apr. 2, 2001 (DE) ..................................... 201 05 733 U

(51) Int. Cl.⁷ ............................................. B60R 21/16
(52) U.S. Cl. ..................................... 280/731; 200/61.54
(58) Field of Search ............................. 280/728.2, 731; 200/61.54, 61.55

(56) References Cited

U.S. PATENT DOCUMENTS

| | | | | |
|---|---|---|---|---|
| 5,002,306 A | * | 3/1991 | Hiramitsu et al. | .......... 280/731 |
| 5,303,952 A | * | 4/1994 | Shermetaro et al. | ........ 280/731 |
| 5,331,124 A | * | 7/1994 | Danielson | ................ 200/61.54 |
| 6,062,595 A | * | 5/2000 | Ha | .............................. 280/731 |
| 6,147,315 A | * | 11/2000 | Rudolph et al. | ......... 200/61.54 |
| 6,183,005 B1 | * | 2/2001 | Nishijima et al. | .......... 280/731 |
| 6,316,537 B1 | | 11/2001 | Baumann et al. | |
| 6,361,065 B1 | * | 3/2002 | Frisch | ...................... 280/728.2 |
| 6,402,193 B1 | * | 6/2002 | Fleckenstein | ............... 280/731 |
| 6,435,540 B1 | * | 8/2002 | Durre | ..................... 280/728.2 |
| 6,464,247 B1 | | 10/2002 | Laue | |
| 6,592,141 B1 | * | 7/2003 | Dancasius et al. | ....... 280/728.2 |
| 6,637,770 B2 | | 10/2003 | Helmstetter | ................. 280/731 |

FOREIGN PATENT DOCUMENTS

| | | |
|---|---|---|
| DE | 19641938 | 4/1998 |
| DE | 29816925 | 1/1999 |
| DE | 29902033 | 5/1999 |
| DE | 19854819 | 5/2000 |

\* cited by examiner

*Primary Examiner*—Paul N. Dickson
*Assistant Examiner*—Toan C To
(74) *Attorney, Agent, or Firm*—Tarolli, Sundheim, Covell & Tummino L.L.P.

(57) ABSTRACT

The invention relates to a gas bag module comprising a gas generator and an elastic bearing element by means of which the gas generator is mounted so as to be neutralized with regard to vibrations in the gas bag module. The bearing element is electrically conductive and forms a part of an electrical earth lead for the gas generator. The invention further relates to a steering wheel comprising a gas bag module equipped with a gas generator. The gas bag module is mounted on the steering wheel so as to be neutralized with regard to vibrations by means of an elastic bearing element. The elastic bearing element is electrically conductive and forms a part of an earth lead of the gas generator.

20 Claims, 2 Drawing Sheets

GAS BAG MODULE AND VEHICLE STEERING WHEEL

TECHNICAL FIELD

The invention relates to a gas bag module as well as to a vehicle steering wheel incorporating a gas bag module.

BACKGROUND OF THE INVENTION

Known gas bag modules comprise a gas generator and an elastic bearing element by means of which the gas generator is mounted in the module so as to be neutralized with regard to vibrations. There are also known steering wheels that comprise a gas bag module which contains a gas generator, the gas bag module being mounted on the steering wheel by means of an elastic bearing element so as to be neutralized with regard to vibrations.

Gas bag modules arranged in the steering wheel increase the safety of the driver considerably. Owing to the relatively high mass of the gas bag module, however, oscillations and vibrations occur in the steering wheel to an intensified extent, which have an intrusive effect and impair the driving safety. In order to reduce such vibrations, it is known to mount the gas bag module or the gas generator which takes up a majority of the mass of the gas bag module, so as to be neutralized with regard to vibrations in relation to the steering wheel or so as to decouple the module from the steering wheel as concerns vibrations. The gas generator or gas bag module which is mounted in this way can then carry out a vibrational movement which is independent of the steering wheel vibrations. The mounting takes place by means of one or more elastic bearing elements. By adapting the spring rate of the elastic bearing element, the resonance frequency of the vibration of the gas generator or of the gas bag module can be adjusted such that a damping of the steering wheel vibrations is possible, so that a so-called vibration damper is created. Because of the favorable spring rates for this use, preferably elastic bearing elements of elastomers or polymers are used. In gas generators which are mounted so as to be neutralized with regard to vibrations in this way, the problem now occurs that these gas generators are no longer connected with other parts of the vehicle so as to be electrically conductive and are earthed via this connection. In order to prevent the gas generator from igniting at an inopportune time due to interference pulses or accumulated electrical charges, it is known to connect an additional earth cable to the gas generator. This is a disadvantage in particular owing to the small amount of space which is available in the gas bag module or in the steering wheel.

BRIEF SUMMARY OF THE INVENTION

The object of the invention consists in improving the earthing of a gas generator which is mounted so as to be neutralized with regard to vibrations.

This is achieved in a generic gas bag module comprising a gas generator and an elastic bearing element by means of which the gas generator is mounted so as to be neutralized with regard to vibrations in the gas bag module. The bearing element is electrically conductive and forms a part of an electrical earth lead for the gas generator. Thus, the elastic bearing element is constructed so as to be electrically conductive whilst maintaining the vibration characteristics necessary for a neutralization with regard to vibrations. The invention offers the advantage that through the elimination of the separate earthing cable, the required structural space is reduced. In addition, the vibration characteristics can no longer be influenced disadvantageously by the separate earthing cable. In addition, the earthing of the gas generator is improved with respect to the use of an earthing cable, because the elastic bearing element generally lies with a larger surface against the gas generator than an earthing cable does.

Owing to the advantageous vibration characteristics of elastomers, the elastic bearing element preferably comprises an elastomeric element. This elastomeric element can advantageously consist of rubber, a material which has the desired vibration characteristics and is cheap and easy to process.

In a preferred embodiment of the invention, the elastomeric element comprises an electrically conductive elastomer which can be achieved for example in that soot- or metal particles are admixed to an elastomer.

In another preferred embodiment, the elastic bearing element has several layers, one layer of which consists of an electrically conductive material. The electrically conductive layer is preferably arranged between two layers of elastic material. Thus, materials can be combined with each other, which on the one hand have a good electrical conductivity and on the other hand give the elastic bearing element favorable vibration characteristics. The layers of elastic material can represent the elastomeric element in this embodiment.

Suitable materials for the conductive layer are for example metal braid, metal wire, metal foil or carbon fiber. It is also conceivable for example to use a foil coated with a conductive material, such as brass for example.

In order to achieve good vibration characteristics and a high load carrying ability of the elastic bearing element, the electrically conductive layer preferably has openings through which the elastic layers are connected with each other. It is in this way that a firm bonding of the different materials can be achieved.

An alternative to this for mounting the gas generator so as to be neutralized with regard to vibrations consists in mounting the entire gas bag module in the steering wheel so as to be neutralized with regard to vibrations and possibly to use it for vibration damping. The problem posed here is identical to the one described above.

The problem described is eliminated in a steering wheel comprising a gas bag module equipped with a gas generator, the gas bag module being mounted on the steering wheel so as to be neutralized with regard to vibrations by means of an elastic bearing element. The elastic bearing element is electrically conductive and forms a part of an earth lead of the gas generator. The advantages which are offered by the invention correspond to those named for the gas bag module. As the separate earthing cable is eliminated, the space requirement for the gas bag module is reduced, which is particularly favorable with use in a steering wheel which is to be constructed so as to be as slim as possible for visual and safety technological reasons.

The invention provides a simple earthing of the gas generator, although the gas generator or the gas bag module is mounted with an elastic bearing element, having a favorable vibration frequency, so as to be neutralized with regard to vibrations from the steering wheel.

According to the invention, the elastic bearing element is part of an earth lead which runs from the gas generator to the steering wheel. An earth lead is generally understood here to mean the electrical connection of the gas generator with earth, irrespective of whether this earth lead is composed of one or several components. It is decisive that an earth connection to the gas generator is created. The elastic bearing element can be arranged here between various components, thus for example between the gas generator and a gas bag module housing, between a module housing and the steering wheel or else between a gas bag carrier and an intermediate plate which is connected with the module housing. It is only essential that these components are connected with each other such that an earth lead to the gas generator is produced.

Preferably the vibration characteristics are mainly determined by an elastomeric element which is part of the elastic bearing element. Materials such as elastomer or rubber which are used conventionally can be used for the elastomeric element.

Further advantageous features of the invention are described in the sub-claims.

DETAILED DESCRIPTION OF THE PREFERRED EMBODIMENTS

Figure 1:
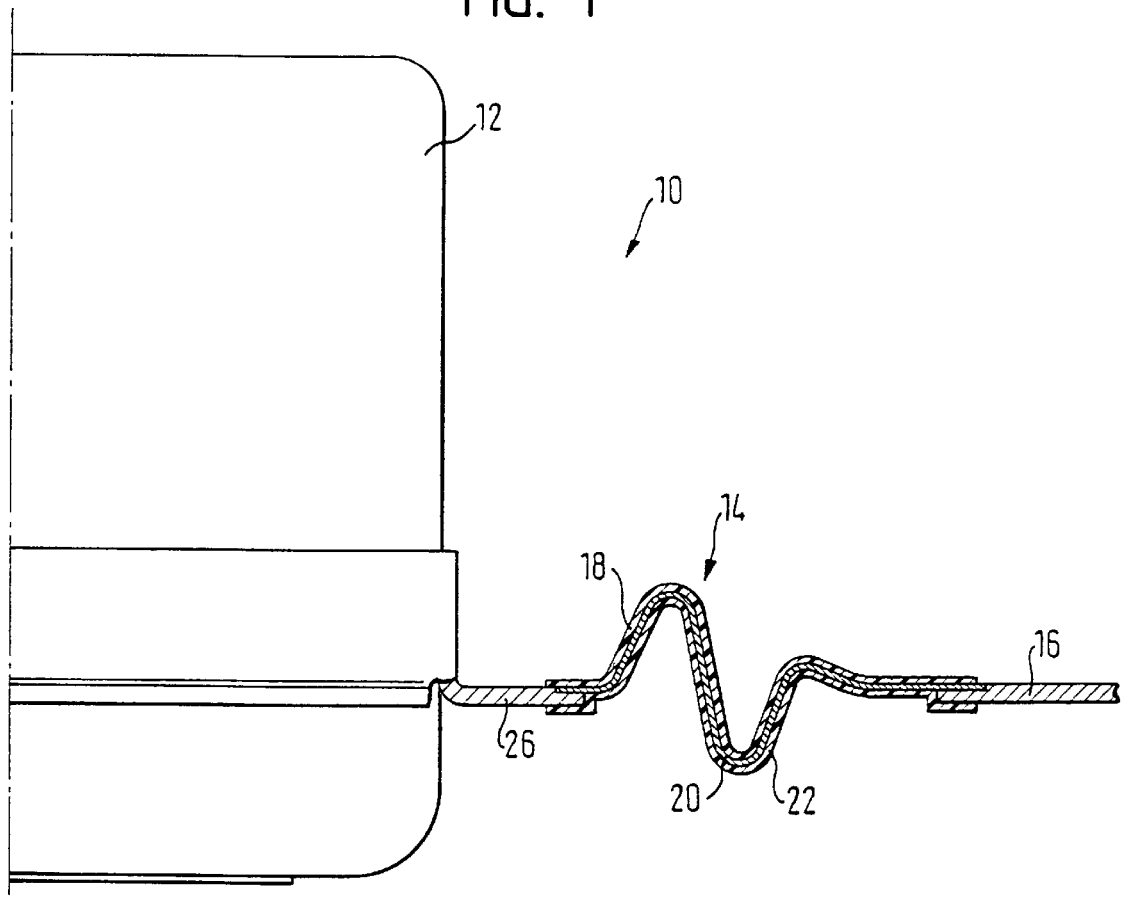
FIG. 1 shows a sectional view of a part of a gas bag module according to the invention.

FIG. 1 shows a part of a gas bag module 10 according to the invention, comprising a gas generator 12 which is mounted by means of an elastic bearing element 14 so as to be neutralized with regard to vibrations with respect to a module housing 16. The elastic bearing element 14 forms at least a part of an earth lead of the gas generator 12 to an electric mass, e.g. a steering wheel, a steering wheel column or another vehicle part. The reminder of the earth lead can be defined by metal housings or metal fasteners which are already provided in a steering wheel. The elastic bearing element 14 has three layers 18, 20, 22. The layers 18, 22 on the outside consist of an elastic material, preferably an elastomer and particularly preferably of rubber, whereas the central layer 20 consists of an electrically conductive material. The electrically conductive material can, for example, be metal wires or a metal braid, but also a foil which is provided with a conductive coating, for example of brass. The electrically conductive layer 20 can also be formed from aramide- or carbon fibers.

Figure 2:
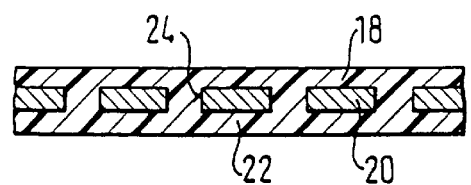
FIG. 2 shows a sectional view of a section of an elastic bearing element according to the invention.

In the embodiment illustrated in FIG. 2, the conductive layer 20 has openings 24 through which the two elastic, electrically non-conducting layers 18, 22 are connected with each other, for example by vulcanization.

Other embodiments of the elastic bearing element 14 are also conceivable. Thus, for example, the bearing element 14 can consist completely of a conductive elastomer, which is mixed for example with metal particles or with soot particles; one of the layers, however, may also be produced from a conductive elastomer. The conductive layer does not have to be arranged in the middle.

The elastic bearing element 14 is formed and arranged such that the gas generator 12 is neutralized with regard to vibrations from the module housing 16. For this purpose, the elastic bearing element 14 can have, for example, the undulating shape shown in FIG. 1. The spring rate of the elastic bearing element 14 can be selected such that the gas generator 12 can operate as a vibration damper.

It is important that the elastic bearing element 14 is connected with the gas generator 12 and the module housing 16 such that the conductive layer 20 is in contact with electrically conductive parts of the module housing 16 or of the gas generator 12. This can take place for example as in the embodiment shown here in that the conductive layer 20 is brought into electrical contact with a flange 26 of the gas generator 12, or else through electrical contacting of the conductive layer to a generator carrier connected conductively with the gas generator. Further components can also be intercalated, as it were, between gas generator 12 and module housing 16, as long as a conductive connection remains from the gas generator 12 to the module housing 16 via the elastic bearing element 14.

Figure 3:
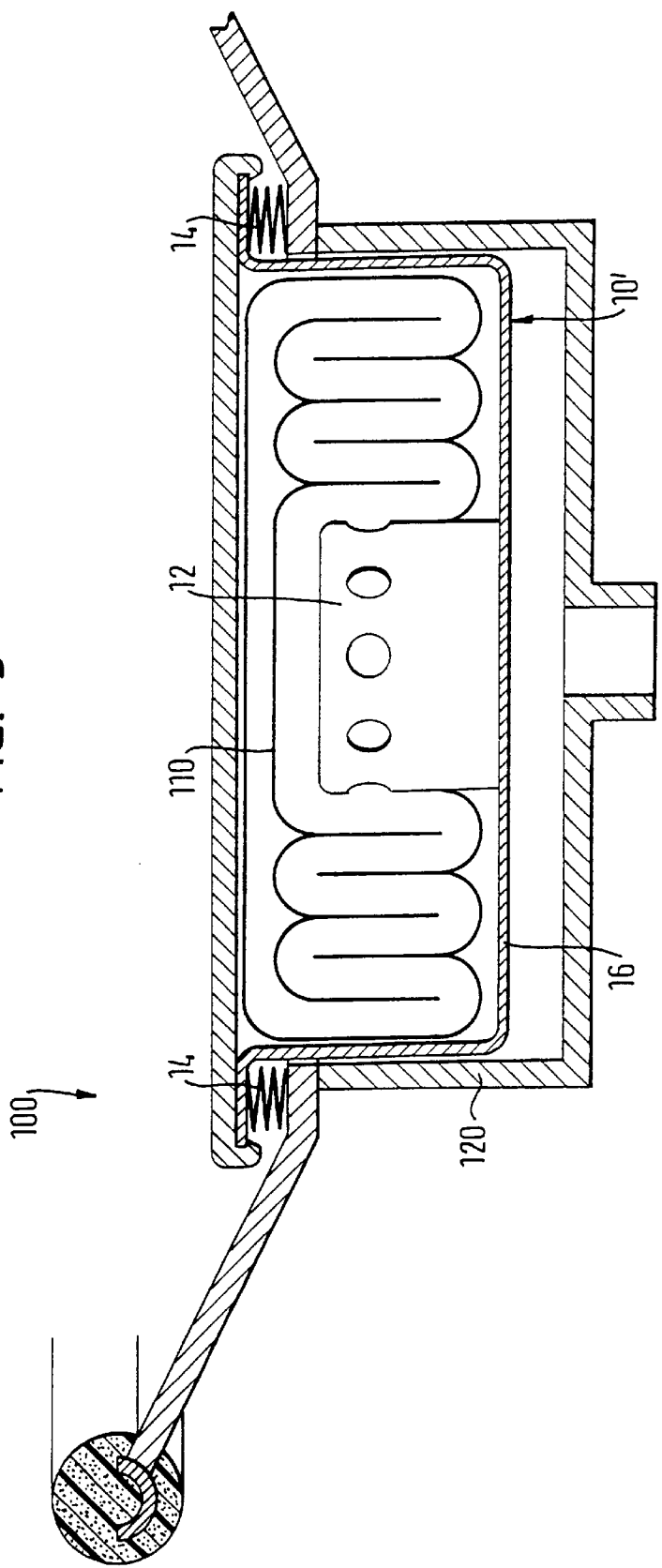
FIG. 3 shows a sectional view of a steering wheel according to the invention.

FIG. 3 shows a further embodiment of the invention. In a steering wheel 100 a gas bag module 10' is mounted so as to be neutralized with regard to vibrations via elastic bearing elements 14. The elastic bearing elements 14 are illustrated diagrammatically in FIG. 3, but preferably have a shape and an embodiment which correspond to those described above. The spring rate of the elastic elements 14 can be selected such that the gas bag module can be used as vibration damper.

In the gas bag module 10', a gas generator 12 and a gas bag 110 are arranged, the gas generator 12 being connected firmly and so as to be electrically conductive with the module housing 16. The elastic bearing elements 14 are arranged such that they form part of an earth lead of the gas generator 12 and preferably such that an electrical connection is created between the module housing 16 and a skeleton 120 of the steering wheel 100 consisting of a metallic material.

What is claimed is:

1. A gas bag module comprising a gas generator and an elastic bearing element by means of which said gas generator is mounted so as to be neutralized with regard to vibrations in said gas bag module, said elastic bearing element being electrically conductive and forming at least a part of an electrical earth lead for said gas generator.

2. The gas bag module according to claim 1, wherein said elastic bearing element comprises an elastomeric element.

3. The gas bag module according to claim 2, wherein said elastomeric element consists of rubber.

4. The gas bag module according to claim 2, wherein said material element comprises an electrically conductive elastomer.

5. The gas bag module according to claim 1, wherein said elastic bearing element has several layers.

6. The gas bag module according to claim 5, wherein at least one of said layers consists of an electrically conductive material.

7. The gas bag module according to claim 6, wherein said electrically conductive layer is arranged between two layers of elastic material.

8. The gas bag module according to claim 7, wherein said electrically conductive layer is made of a material chosen from the group consisting of metal braid, metal wire, metal foil, a foil coated with an electrically conductive material, and carbon fiber.

9. The gas bag module according to claim 6, wherein said electrically conductive layer has openings.

10. The gas bag module according to claim 9, wherein said elastic layers are connected with each other through said openings.

11. A steering wheel comprising a gas bag module equipped with a gas generator, said gas bag module being mounted on said steering wheel so as to be neutralized with regard to vibrations by means of an elastic bearing element, said elastic bearing element being electrically conductive and forming at least a part of an earth lead of said gas generator.

12. The steering wheel according to claim 11, wherein said elastic bearing element comprises an elastomeric element.

13. The steering wheel according to claim 12, wherein said elastomeric element consists of rubber.

14. The steering wheel according to claim 12, wherein said material element comprises an electrically conductive elastomer.

15. The steering wheel according to claim 11, wherein said elastic element has several layers.

16. The steering wheel according claim 15, wherein at least one of said layers consists of an electrically conductive material.

17. The steering wheel according to claim 16, wherein said electrically conductive layer is arranged between two layers of elastic material.

18. The steering wheel according to claim 17, wherein said electrically conductive layer is made of a material chosen from the group consisting of metal braid, metal wire, metal foil, a foil coated with an electrically conductive material, and carbon fiber.

19. The steering wheel according to claim 16, wherein said electrically conductive layer has openings.

20. The steering wheel according to claim 19, wherein said elastic layers are connected with each other through said openings.

* * * * *

UNITED STATES PATENT AND TRADEMARK OFFICE
CERTIFICATE OF CORRECTION

PATENT NO. : 6,811,181 B2
DATED : November 2, 2004
INVENTOR(S) : Constantin Hauer It is certified that error appears in the above-identified patent and that said Letters Patent is hereby corrected as shown below:

Column 4,
Line 45, before "element" change "material" to -- elastomeric --.
Line 45, after "conductive" change "elastomer" to -- material --.

Column 5,
Line 11, after "said" change "material" to -- elastomeric --.
Line 12, after "conductive" change "elastomer" to -- material --.

Signed and Sealed this

Eighth Day of March, 2005

JON W. DUDAS
*Director of the United States Patent and Trademark Office*